US005490484A

United States Patent [19]
Rutschmann

[11] Patent Number: 5,490,484
[45] Date of Patent: Feb. 13, 1996

[54] AIR INTAKE SYSTEM OF AN INTERNAL-COMBUSTION ENGINE

[75] Inventor: Erwin Rutschmann, Tiefenbronn, Germany

[73] Assignee: Dr. Ing. h.c.F. Porsche AG, Weissach, Germany

[ * ] Notice: The term of this patent shall not extend beyond the expiration date of Pat. No. 5,406,913.

[21] Appl. No.: 297,108

[22] Filed: Aug. 26, 1994

[30] Foreign Application Priority Data

Sep. 9, 1993 [DE] Germany .................. 43 30 566.0

[51] Int. Cl.$^6$ .................................................. F02B 27/00
[52] U.S. Cl. ............................ 123/184.49; 123/184.57
[58] Field of Search ................. 123/184.26, 184.36, 123/184.24, 184.25, 184.34, 184.35, 184.44, 184.48, 184.49, 184.52, 184.53, 184.55, 184.56, 184.57, 184.59

[56] References Cited

U.S. PATENT DOCUMENTS

| | | | |
|---|---|---|---|
| 2,916,027 | 12/1959 | Chayne et al. | 123/184.57 |
| 4,510,896 | 4/1985 | Rutschmann | 123/184.57 |
| 4,622,926 | 11/1986 | Rutschmann et al. | 123/184.57 |
| 4,630,575 | 12/1986 | Hatamura et al. | 123/184.57 |
| 4,766,853 | 8/1988 | Iwanami | 123/184.49 |
| 4,957,071 | 9/1990 | Matsuo et al. | |
| 5,255,638 | 10/1993 | Sasaki et al. | 123/184.57 |

FOREIGN PATENT DOCUMENTS

| | | |
|---|---|---|
| 0159803A3 | 10/1985 | European Pat. Off. . |
| 0405612A1 | 1/1991 | European Pat. Off. . |
| 3424433 | 1/1986 | Germany . |
| 4014291 | 11/1991 | Germany . |
| 62-101821 | 5/1987 | Japan . |

Primary Examiner—Marguerite Macy
Attorney, Agent, or Firm—Evenson McKeown Edwards & Lenahan

[57] ABSTRACT

An air intake system has two resonance chambers coupled together by connecting pipes. The resonance chambers are connected to the cylinders by individual intake pipes. A further common chamber is coupled by means of resonance pipes to the resonance chamber. The connecting pipe and several of the resonance pipes have controllable blocking elements. A branch that supplies air to the system is connected with one of the connecting pipes and the further chamber. To deliberately increase the mean pressure, the blocking elements can be connected in cascade fashion as the rpm rises, causing the coupled volume to increase.

21 Claims, 4 Drawing Sheets

AIR INTAKE SYSTEM OF AN INTERNAL-COMBUSTION ENGINE

BACKGROUND AND SUMMARY OF THE INVENTION

The invention relates to an air intake system of a multi-cylinder internal combustion engine with the cylinders of one row each being connected by intake pipes to a resonance chamber associated with this row, and with at least one connecting pipe running between the resonance chambers, into which fresh air flows and which has at least one controllable blocking element.

The performance of an internal combustion engine is directly proportional to the product of its stroke volume and the mean pressure. If an increase in stroke volume that is unfavorable with regard to exhaust volume and fuel consumption is to be avoided, a deliberate increase in mean pressure is all that can increase performance. This also causes the torque of the internal combustion engine to increase, since it is a direct result of the above product.

An air intake system with two resonance chambers is known from German Patent Document DE-34 24 433 A1. These chambers are connected together by two blockable resonance tubes, into which the incoming fresh air flows. From the resonance chambers, individual intake pipes lead to the intake manifolds of the cylinder heads. Depending on the connecting cross section of the chambers, controlled by throttle flaps, the mean pressure and hence the torque can be increased over a wide rpm range.

An object of the invention is to improve an air intake system of the above-noted type in such fashion that the mean pressure is increased as much as possible over the entire rpm range of the internal combustion engine.

This object is achieved by providing an arrangement wherein at least one resonance pipe is associated with each cylinder, said pipes being arranged to extend from resonance chambers of one row of cylinders to a common chamber common to the resonance pipes and provided with a fresh air inlet, and wherein a controllable blocking element is located in at least one of the resonance pipes associated with one row of cylinders.

In an internal combustion engine, when a resonance pipe is associated with each cylinder, in addition to the two-chamber resonance system formed by the resonance chambers and the connecting pipe in an internal combustion engine, said resonance pipe extending from the resonance chamber of the respective row of cylinders to a chamber common to all the resonance pipes, said chamber having a fresh air inlet and at least one controllable blocking element disposed in one of the resonance pipes of a row of cylinders, this chamber acts together with the resonance pipes to ensure that each cylinder receives an increased volume of fresh air, causing the mean pressure to rise. By means of the controllable blocking element, the resonance system available at a given time is adapted to the current rpm range of the internal combustion engine, so that a uniform torque curve at a high level is ensured without perceptible interruptions.

In one advantageous design, several of the resonance pipes of a row of cylinders can have blocking elements, thus ensuring further-improved adaptation of the resonance system to the engine rpm.

In this connection, the resonance pipes can have diameters and/or lengths that differ from one another, as a result of which the requirement for comparatively long and thin pipes for a favorable torque curve in the lower rpm range and relatively short pipes with larger diameters in the upper rpm range is taken into account.

A further improvement in adaptation to the requirements of the various rpm ranges is possible with a second connecting pipe, provided with a controllable control element, between the resonance chambers, said pipe working as a resonance pipe, like the first.

In another advantageous embodiment, identical pipe lengths of opposite resonance pipes and a flow-favorable straight-line pattern is achieved when the chamber is located in a plane of symmetry running in the lengthwise direction of the internal combustion engine, with the resonance chambers being located at a distance from, and parallel to, said plane.

The resonance pipe lengths then required can be obtained by mounting a chamber on the side of the connecting pipe away from the internal combustion engine.

Optimum inflow conditions in the intake pipes can be obtained if the segments of the resonance pipes located in the resonance chambers are cylindrical and flush with the intake funnels of the intake pipes. As a result, there is no crankshaft angle at which there is a shortage of air upstream from an intake funnel, possibly due to another cylinder being on intake.

In an internal combustion engine which, in addition to the blockable intake valves supplied by the intake pipe(s), has permanently operated intake valves, an additional resonance pipe can be associated with each cylinder that runs directly from the chamber to this valve. This permits operation that reduces emissions, in a comparatively low power range of the internal combustion engine, while when the load or rpm increases, the blocking elements are closed in stages, with the blockable intake valves being closed.

All blocking elements can be designed as rotary flaps that can be moved by pneumatic actuators. These in turn are triggered by timing valves controlled by an electronic control device of the internal combustion engine. This control device controls the timing valves as a function of the engine rpm and/or load (e.g., throttle flap position).

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1:
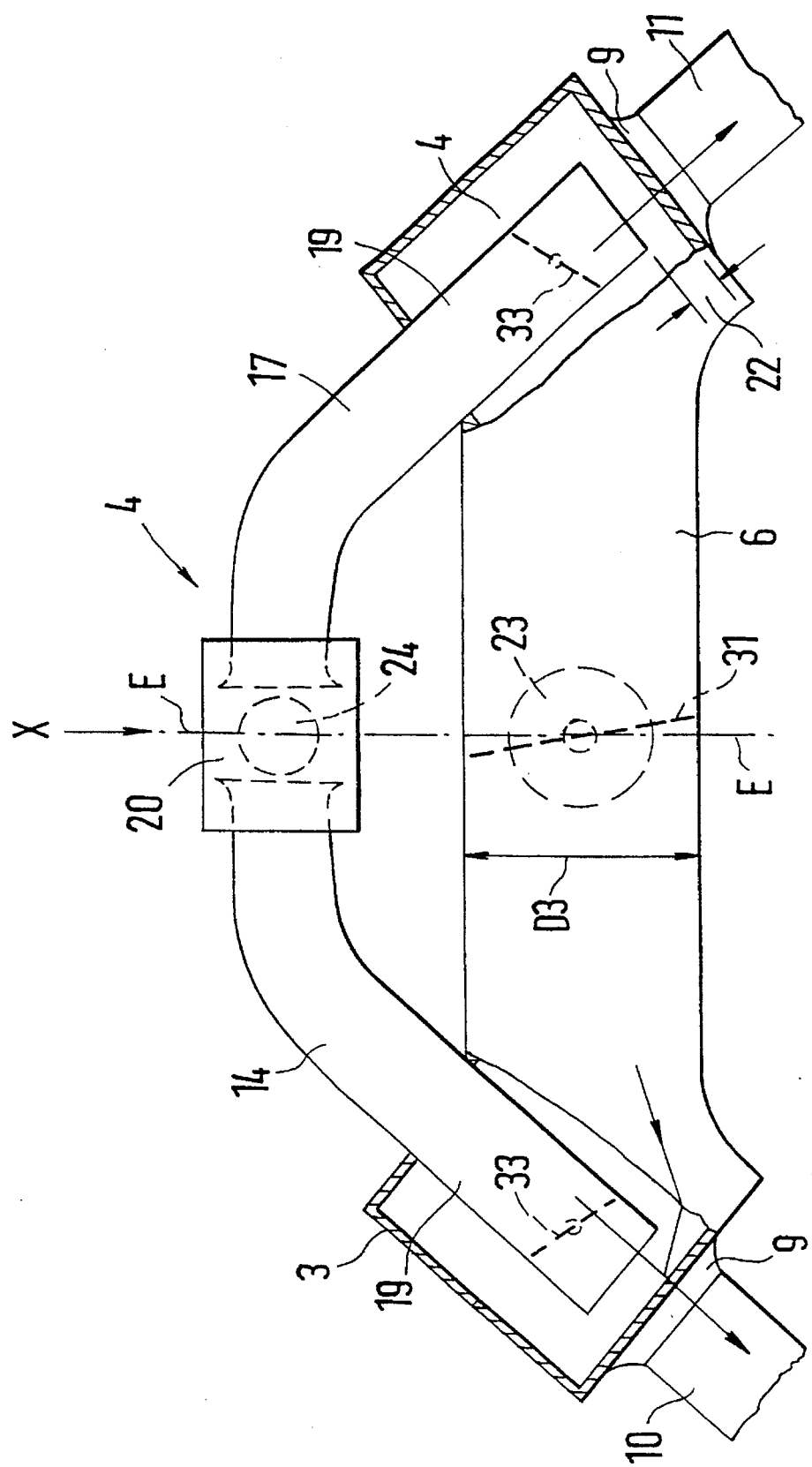
FIG. 1 is a partial schematic partially cut away side view of an engine air intake system constructed according to a preferred embodiment of the invention.
Figure 2:
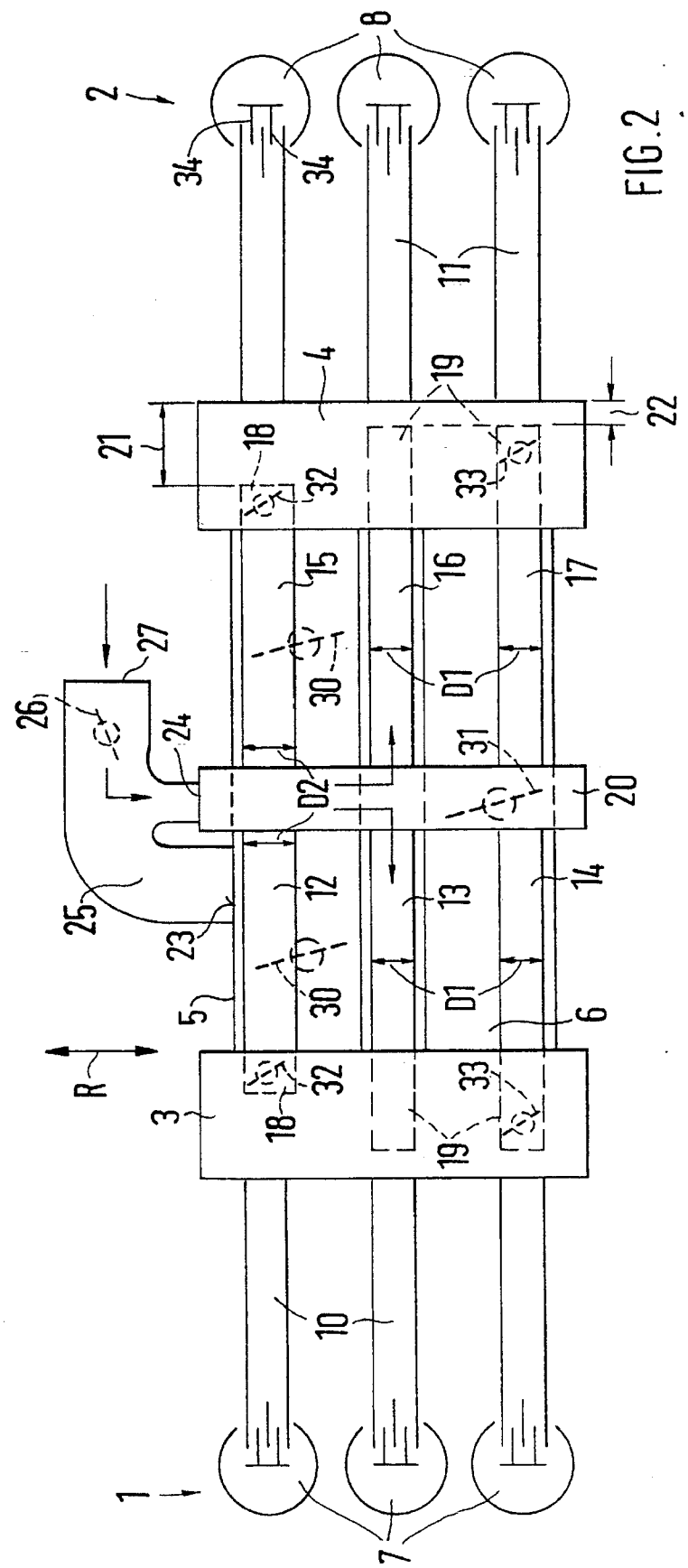
FIG. 2 is a schematic top view as viewed in the direction of arrow X in FIG. 1, showing the air intake system in a first state.

An internal combustion engine with two rows of cylinders 1, 2 has an air intake system consisting of resonance chambers 3, 4 associated with these rows of cylinders 1, 2, first and second connecting pipes 5 and 6 connecting the latter with one another, and intake pipes 10, 11 running from individual cylinders 7, 8 to resonance chambers 3, 4 and connected thereto by intake funnels 9.

One of the resonance pipes 12 to 17 is associated with each cylinder 7, 8, said pipe running with a section 18 or 19 provided within the respective resonance chamber 3, 4 and extending up to a chamber 20 lying in a plane of symmetry E—E. Segments 18, 19 run cylindrically and flush to intake funnels 9, leaving a space 21, 22.

First connecting pipe 5 and chamber 20 have fresh air inlets 23 and 24 respectively to which a branch 25 is connected that is supplied with intake air through an inlet 27 controlled by a throttle flap 26.

On both sides of fresh air inlet 23, in first connecting pipe 5, a controllable blocking element 30 is provided, while second connecting pipe 6 has a controllable blocking element 31 located roughly in plane of symmetry E—E. Of the three resonance pipes 12, 13, 14 and 15, 16, 17 located side by side, of a row of cylinders 1 or 2, the two pipes located externally 12, 15 and 14, 17 have a controllable blocking element 32 or 33.

Two resonance pipes 13, 14 and 16, 17 of a row of cylinders 1 or 2 each have an identical diameter D1, while the other resonance pipe 12 or 15 in each case has a slightly larger diameter D2.

Connecting pipes 5, 6 have an identical diameter D3, which is roughly twice as large as diameter D1 or D2

Resonance chambers 3 and 4 extend parallel to plane of symmetry E—E and with a distance between them to which connecting pipes 5 and 6 are arranged perpendicularly. Resonance pipes 12 to 17 extend in planes that are parallel to one another and perpendicular to plane E—E.

In a first state with a comparatively low rpm of the internal combustion engine according to FIG. 1, all blocking elements 30 to 33 are closed. Fresh air passes through chamber 20 and middle resonance pipes 13 and 16 into resonance chambers 3 and 4 and from there to cylinders 7 and 8 through the respective two intake valves 34 of an intake pipe 10 or 11 supplying a cylinder 7, 8.

As the rpm increases further, blocking elements 30 to 33 are controlled successively cascade-fashion, so that a total of five states results. A second state is produced by simultaneous opening of blocking elements 33 in resonance pipes 14 and 17, and in the third state blocking elements 32 additionally open resonance pipes 12 and 15.

In these three states, the entire volume of fresh air drawn in passes exclusively through chamber 20 to cylinders 7, 8.

Figure 3:
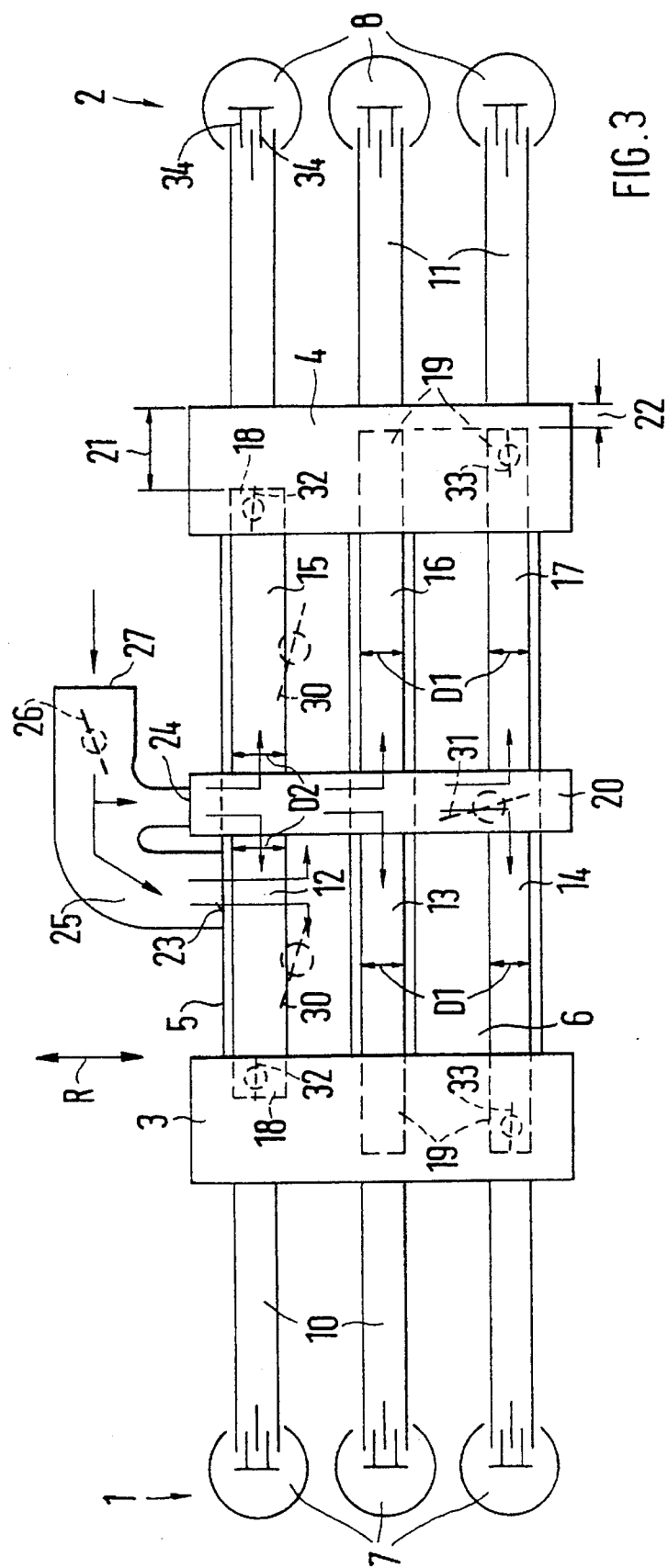
FIG. 3 is a schematic top view as viewed in the direction of arrow X in FIG. 1 showing the air intake system in another state.

In a fourth state according to FIG. 3, blocking elements 30 are opened so that, in addition, intake air flows through first connecting pipe 5 into resonance chambers 3 and 4. Finally, for maximum rpm, in the fifth state, blocking element 31 is opened so that the entire volume in the intake system is coupled. As the rpm falls, the blocking elements are closed in the reverse sequence.

Figure 4:
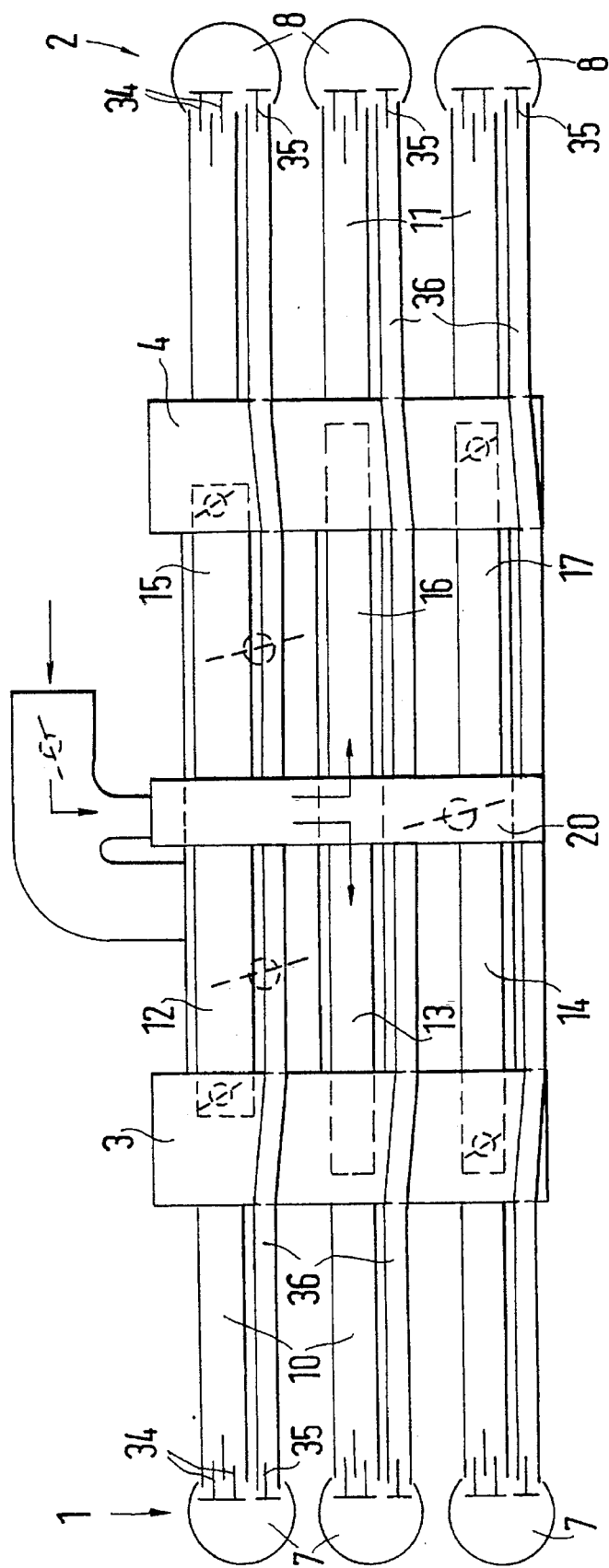
FIG. 4 is a schematic top view as viewed in the direction of arrow X according to FIG. 1, of a variation on the invention.

In a variation according to FIG. 4, each cylinder 7, 8 has an additional intake valve 35. An individual resonance pipe 36 is associated with each of these intake valves 35, said pipe extending directly from chamber 20 to these intake valves 35, bypassing resonance chambers 3 and 4, and having no blocking element.

Intake valves 34 are made so that they can be shut off in a manner not shown, while intake valves 35 are operated permanently.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Air intake system of a multicylinder two-row internal combustion engine, with the cylinders of both rows each being connected by intake pipes to a resonance chamber associated with the respective row, and with at least one connecting pipe running between the resonance chambers, into which fresh air flows and which has at least one controllable blocking element, wherein each cylinder is provided with at least one separate corresponding resonance pipe, each of said resonance pipes being arranged to extend from one of said resonance chambers to a common chamber which is common to the resonance pipes and provided with a fresh air inlet, and wherein a controllable blocking element is located in at least one of the resonance pipes.

2. System according to claim 1, wherein a controllable blocking element is disposed in at least two resonance pipes of each row of cylinders.

3. System according to claim 1, wherein a second connecting pipe is connected to extend parallel to a first connecting pipe between resonance chambers, said second pipe having at least one controllable blocking element.

4. System according to claim 1, wherein resonance chambers are arranged on both sides of, at a distance from, and parallel to a plane of symmetry, and wherein the common chamber is mounted so that it extends in this plane of symmetry.

5. System according to claim 3, wherein resonance chambers are arranged on both sides of, at a distance from, and parallel to a plane of symmetry, and wherein the common chamber is mounted so that it extends in this plane of symmetry.

6. System according to claim 5, wherein said connecting pipes extend perpendicular to a plane of symmetry between the internal combustion engine and the common chamber.

7. System according to claim 1, wherein segments of the resonance pipes extend within the resonance chambers.

8. System according to claim 7, wherein blocking elements are disposed in the segments of the resonance pipes extending within the resonance chambers.

9. System according to claim 1, wherein at least two resonance pipes of each row of cylinders have diameters different from one another.

10. System according to claim 7, wherein at least two of the segments of the resonance pipes extending within the resonance chambers have lengths different from one another.

11. System according to claim 9, wherein at least two of the segments of the resonance pipes extending within the resonance chambers have lengths different from one another.

12. System according to claim 9, wherein two resonance pipes of one row of cylinders have an identical diameter, while one of these pipes contains a controllable blocking element.

13. System according to claim 10, wherein two resonance pipes of one row of cylinders have an identical diameter, while one of these pipes contains a controllable blocking element.

14. System according to claim 8, wherein the segments are cylindrical and are aligned with and spaced apart from intake funnels of the intake pipes.

15. System according to claim 3, wherein the first connecting pipe has two controllable blocking elements, one on each side of an engine plane of symmetry, and wherein the second connecting pipe has a controllable blocking element located roughly in said plane.

16. System according to claim 12, wherein each row of cylinders has three resonance pipes lying side by side in a lengthwise direction of the internal combustion engine, with controllable blocking elements being associated with the two outside resonance pipes.

17. System according to claim 3, wherein the two connecting pipes have an identical diameter that is roughly twice the diameter of the resonance pipes.

18. System according to claim 1, wherein an additional resonance pipe is associated with each cylinder, said additional resonance pipe extending from the cylinders to the common chamber, bypassing the resonance chambers.

19. Air intake system of a multicylinder two-row internal combustion engine, with the cylinders of both rows each being connected by intake pipes to a resonance chamber associated with the respective row, and with a first connecting pipe extending between the resonance chambers, into which fresh air flows, and a second connecting pipe extending between the resonance chambers in parallel with said first connecting pipe and having at least one controllable blocking element, wherein at least one resonance pipe is associated with each cylinder, said resonance pipes being arranged to extend from resonance chambers of one row of cylinders to a common chamber which is common to the resonance pipes and which is provided with a fresh air inlet, and wherein a controllable blocking element is located in at least one of the resonance pipes associated with one row of cylinders.

20. Air intake system of a multicylinder two-row internal combustion engine, with the cylinders of both rows each being connected by intake pipes to a resonance chamber associated with the respective row, and with at least one connecting pipe running between the resonance chambers, into which fresh air flows and which has at least one controllable blocking element, wherein at least one resonance pipe is associated with each cylinder, said resonance pipes being arranged to extend from resonance chambers of one row of cylinders to a common chamber which is common to the resonance pipes and which is provided with a fresh air inlet, wherein a controllable blocking element is located in at least one of the resonance pipes associated with one row of cylinders, and wherein at least two resonance pipes of each row of cylinders have diameters different from one another.

21. Air intake system of a multicylinder two-row internal combustion engine, with the cylinders of both rows each being connected by intake pipes to a resonance chamber associated with the respective row, and with at least one connecting pipe running between the resonance chambers, into which fresh air flows and which has at least one controllable blocking element, wherein at least one resonance pipe is associated with each cylinder, said resonance pipes being arranged to extend from resonance chambers of one row of cylinders to a common chamber which is common to the resonance pipes and which is provided with a fresh air inlet, wherein a controllable blocking element is located in at least one of the resonance pipes associated with one row of cylinders, and wherein an additional resonance pipe is associated with each cylinder, said additional resonance pipe extending from the cylinders to the common chamber, bypassing the resonance chambers.

\* \* \* \* \*